US007306516B2

(12) United States Patent
Iosilevsky

(10) Patent No.: US 7,306,516 B2
(45) Date of Patent: Dec. 11, 2007

(54) ELECTRONIC GAME TABLE

(76) Inventor: Alex Iosilevsky, 2159 31st Ave., San Francisco, CA (US) 94116

( * ) Notice: Subject to any disclaimer, the term of this patent is extended or adjusted under 35 U.S.C. 154(b) by 0 days.

(21) Appl. No.: 10/810,255

(22) Filed: Mar. 29, 2004

(65) Prior Publication Data

US 2005/0215326 A1 Sep. 29, 2005

(51) Int. Cl.
*A63F 13/00* (2006.01)

(52) U.S. Cl. ........................................................ 463/13

(58) Field of Classification Search ............ 463/12–13, 463/16, 22, 30, 47, 11; 273/292, 309
See application file for complete search history.

(56) References Cited

U.S. PATENT DOCUMENTS

| | | | |
|---|---|---|---|
| 4,339,134 | A | 7/1982 | Macheel |
| 4,760,527 | A | 7/1988 | Sidley |
| 4,856,787 | A | 8/1989 | Itkis |
| 4,926,327 | A | 5/1990 | Sidley |
| 5,377,973 | A | 1/1995 | Jones |
| 5,570,885 | A | 11/1996 | Ornstein |
| 5,586,257 | A | 12/1996 | Perlman |
| 5,586,766 | A | 12/1996 | Forte |
| 5,586,936 | A | 12/1996 | Bennett |
| 5,613,912 | A | 3/1997 | Slater |
| 5,711,715 | A | 1/1998 | Ringo |
| 5,755,621 | A | 5/1998 | Marks |
| 5,762,552 | A | 6/1998 | Vuong |
| RE035,864 | E | 7/1998 | Weingardt |
| 5,820,460 | A | 10/1998 | Fulton |
| 5,823,873 | A | 10/1998 | Moody |
| 5,853,325 | A | 12/1998 | Kadlic |
| 5,882,259 | A | 3/1999 | Holmes, Jr. |
| 5,882,260 | A | 3/1999 | Marks |
| 5,956,485 | A | 9/1999 | Perlman |
| 6,007,066 | A | 12/1999 | Moody |
| 6,045,129 | A | 4/2000 | Cooper |
| 6,070,878 | A | 6/2000 | Jones |
| 6,073,930 | A | 6/2000 | Jones |
| 6,093,100 | A | 7/2000 | Singer |
| 6,134,590 | A | 10/2000 | Perlman |
| 6,159,095 | A | 12/2000 | Frohm |

(Continued)

OTHER PUBLICATIONS

Provisional application No. 60/481,555 filed on Oct. 24, 2003, Crawford, III et al.*

(Continued)

*Primary Examiner*—Kim Nguyen
(74) *Attorney, Agent, or Firm*—Albert T. Keyack

(57) ABSTRACT

The electronic game table of the invention may comprise a standard game table, e.g., for poker, incorporating multiple player seats for tournament or side game play. Each player has a display device in front of him/her containing information about the card in pocket. The community cards are displayed in the center of the table on a display device. Each player has a console with control elements, such as buttons, computer mouse, touch screen, etc. for activating means of betting, such as coins, tokens, credit or smart card readers, etc. A function of a dealer is accomplished by a central server, e.g., a random combination generator. For participation in multi table tournaments, e.g., of poker, the aforementioned electronic game table is provided with means of interfacing with other tables participating in the tournament via Internet, Intranet, local area network, etc., without participation of a live dealer.

24 Claims, 4 Drawing Sheets

U.S. PATENT DOCUMENTS

| | | | | |
|---|---|---|---|---|
| 6,179,710 | B1 | 1/2001 | Sawyer | |
| 6,254,483 | B1 | 7/2001 | Acres | |
| 6,299,534 | B1 | 10/2001 | Breeding | |
| 6,311,979 | B1 | 11/2001 | Andrews | |
| 6,315,666 | B1 | 11/2001 | Mastera | |
| 6,319,122 | B1 | 11/2001 | Packes, Jr. | |
| 6,375,567 | B1 | 4/2002 | Acres | |
| 6,386,973 | B1 * | 5/2002 | Yoseloff | 463/13 |
| 6,626,757 | B2 | 9/2003 | Oliveras | |
| 6,634,946 | B1 | 10/2003 | Bridgeman | |
| 6,659,866 | B2 | 12/2003 | Frost et al. | |
| 6,695,695 | B2 | 2/2004 | Angel | |
| 6,712,702 | B2 | 3/2004 | Goldberg | |
| 6,729,621 | B2 | 5/2004 | Moody | |
| 6,733,385 | B1 | 5/2004 | Enzminger | |
| 6,755,741 | B1 | 6/2004 | Rafaeli | |
| 6,764,397 | B1 | 7/2004 | Robb | |
| 6,848,997 | B1 | 2/2005 | Hashimoto | |
| 6,877,747 | B2 | 4/2005 | Moody | |
| 6,955,356 | B2 | 10/2005 | Moody | |
| 7,008,319 | B2 | 3/2006 | Montgomery | |
| 2001/0055990 | A1 | 12/2001 | Acres | |
| 2002/0008356 | A1 | 1/2002 | De Keller | |
| 2002/0043765 | A1 | 4/2002 | Moody | |
| 2002/0058546 | A2 | 5/2002 | Acres | |
| 2002/0077170 | A1 | 6/2002 | Johnson | |
| 2002/0123377 | A1 | 9/2002 | Shulman | |
| 2002/0142828 | A1 | 10/2002 | Moody | |
| 2002/0185814 | A1 | 12/2002 | Moody | |
| 2002/0187822 | A1 | 12/2002 | Falciglia | |
| 2002/0198040 | A1 | 12/2002 | Moody | |
| 2003/0032469 | A1 | 2/2003 | Moody | |
| 2003/0064767 | A1 * | 4/2003 | Brown | 463/12 |
| 2003/0064798 | A1 * | 4/2003 | Grauzer et al. | 463/29 |
| 2003/0069055 | A1 | 4/2003 | Moody | |
| 2003/0119579 | A1 | 6/2003 | Walker | |
| 2003/0125101 | A1 | 7/2003 | Campo | |
| 2003/0134670 | A1 | 7/2003 | Kilby | |
| 2003/0189290 | A1 | 10/2003 | Moody | |
| 2003/0195037 | A1 | 10/2003 | Vuong | |
| 2003/0199294 | A1 | 10/2003 | Walker | |
| 2003/0236114 | A1 | 12/2003 | Griswold | |
| 2004/0033824 | A1 | 2/2004 | Fitzhugh | |
| 2004/0092301 | A1 | 5/2004 | Williams | |
| 2004/0116171 | A1 | 6/2004 | Moody | |
| 2004/0147302 | A1 | 7/2004 | Stern | |
| 2004/0160005 | A1 | 8/2004 | Krise | |
| 2004/0198481 | A1 | 10/2004 | Herrington | |
| 2004/0259621 | A1 | 12/2004 | Pfeiffer | |
| 2005/0026667 | A1 | 2/2005 | Moody | |
| 2005/0032563 | A1 * | 2/2005 | Sines | 463/13 |
| 2005/0079912 | A1 | 4/2005 | Hanafusa | |
| 2005/0090304 | A1 | 4/2005 | Crawford, III | |
| 2005/0148377 | A1 | 7/2005 | Goldberg | |
| 2005/0151319 | A1 | 7/2005 | Berman | |
| 2005/0159199 | A1 | 7/2005 | Moody | |
| 2005/0164789 | A1 | 7/2005 | Nakamura | |
| 2005/0181856 | A1 | 8/2005 | Cannon | |
| 2005/0212214 | A1 | 9/2005 | Pfeiffer | |
| 2005/0215300 | A1 | 9/2005 | Oliveras | |
| 2005/0236775 | A1 | 10/2005 | Moody | |
| 2005/0236776 | A1 | 10/2005 | Moody | |
| 2006/0052157 | A1 | 3/2006 | Walker | |
| 2006/0084506 | A1 | 4/2006 | Yoseloff | |

OTHER PUBLICATIONS

Encylopaedia Britannica p. 108, Edition of 1966, vol. 18.

* cited by examiner

ELECTRONIC GAME TABLE

FIELD OF INVENTION

The invention relates to table games, specifically to card game tables, in particular to the tournament type game tables, e.g., for playing poker or a similar multiplayer games.

BACKGROUND TO THE INVENTION

Table games are known to be a part of many societies. Generally, these games can be classified into two groups: ones incorporating interaction of an individual with a dealer (such are the majority of the casino games, e.g., blackjack or roulette) and the others, hereinafter referred to as tournament games, where a participant, which can be an individual or a team, competes only with another participant or team. Another important feature of the tournament games as opposed to casino games is participation of a human factor such as visual interaction between the players, as well as their mathematical and psychological strategies. In this case, the strategy might have the same influence on the outcome of the game as the initial random combination of factors such as a card combination in the hand of each player. For example, a poker player can "bluff" by betting he/she has the best hand when in fact he/she does not and may win by bluffing if players holding superior hands will not call his bet.

Both mentioned types of the table games usually require the presence of a human operator, known as a dealer or croupier (hereinafter referred to as dealer). It should be noted that the role of such a dealer in casino games and tournament games is different. In the first case, a dealer may represent interests of the casino. For example, in a game of roulette the casino wins when the ball hits 0. In the second case, a random combination generator accomplishes the role of the dealer. In some game arrangements once in a game every player assumes the role of a dealer. Due to the requirement of the dealer having to maintain full control including supervising players, taking bets, determining the outcome of the game, calculating and paying winnings, collecting losses and all the while trying to be aware of any instances of cheating, the number of players per table has to be limited so as not to overtax the dealer. Accordingly, the overall profit of the casino or the club where the game takes place derived from the game is limited because the ratio between the dealer's salary and the income generated from the players is not high.

In all the table games described above, all actions, including players betting, game outcome determination, calculation of winners and losers and subsequent settlement, are conducted manually. This presents a number of problems. Firstly, mistakes can be made by the player in placing a bet, resulting in an invalid bet, while mistakes may be made by the dealer in determining winners and more particularly, in calculating and paying out wins.

Many attempts have been taken to automate the job of a dealer. One of the approaches is incorporation of the game machines, such as one disclosed in U.S. Pat. No. 6,695,695, issued in 2002 to Mark Angel. It discloses one of the variations of the electronic card game, in particular a variation of the game known as "video poker". This video-implemented casino card game deals multiple hands. In a preferred embodiment it includes means for simulating a plurality of players on a game display. Each simulated player is dealt a hand of cards pursuant to a predetermined card game selected by a game player. Subsequent to the initial deal, the game player selects which hand to play. Once the hand has been selected, each hand is fully played. Only the game player's hand is fully revealed during play. Based on the game player's final cards, the player is paid according to a pay table. Thereafter, all hands are revealed and the game player is paid a bonus amount if the player's selected hand is the highest hand of the dealt hands. In a card game requiring a draw, or decision, unselected card hands are played according to a preprogrammed methodology within a gaming machine's internal microprocessor. Such a game replaces a dealer with a random (in reality—pseudo-random) sequence generator; however, being individual by nature it does not allow real interaction between the physical players and therefore cannot be used for the tournaments. All the participants of such a video game but one are simulated by a computer and all the psychological strategic parts of the game that constitute an important element of, i.e. poker, is eliminated since there is no human-to-human interaction.

U.S. Pat. No. 6,659,866, issued in 2003 to B. Frost et al. discloses an automated game table, in the preferred embodiment described as a table for roulette. In this apparatus, physical persons that participate in the game are provided with an electronic interface through which the players interact with a dealer. Such a table allows a multiple player arrangement, where the players place bets, and wins or losses are calculated using electronic means, while the game itself is conducted using traditional, manual systems operated by a dealer. The problem of such an arrangement is that despite the dealer need not watch for irregularities or calculate wins and losses, he/she still needs to physically conduct the game elements—for example, spinning a roulette wheel or tossing the cards.

Since the electronic table of the last-mentioned type incorporates a live dealer as an indispensable participant of the game, such table is inconvenient for use in multiple-table tournament games, e.g. poker, where there is no necessity to incorporate the actions of the dealer. More over, participation of several dealers (e.g., one per table) or of a common dealer for a plurality of tables, will impart additional complexity to the game and may lead to human errors.

OBJECTS AND SUMMARY OF THE INVENTION

It is an object of the present invention is to provide an electronic table for games with multiple participants without the presence of the dealer. Another object is to provide a tournament game table wherein the players play without participation of a dealer and where the players may visually and psychologically interact with each other. Still another object is to provide the electronic game table provided with means for combining a plurality of such tables into a multiple table tournament via Internet or a local area network without participation of a live dealer or dealers. Still another object is to provide the electronic table for the game of poker with a virtual dealer.

The electronic game table of the invention may comprise a standard game table, e.g., for poker, incorporating multiple player seats for tournament or side game play. Each player has a display device in front of him/her containing information about the card in pocket. The community cards are displayed in the center of the table on a display device. Each player has a console with control elements, such as buttons, computer mouse, touch screen, etc. for activating means of betting, such as coins, tokens, credit or smart card readers, etc. A function of a dealer is accomplished by a central server, e.g., a random combination generator. For participation in multi table tournaments, e.g., of a poker game, the aforementioned electronic game table is provided with means of interfacing with other tables participating in the tournament via Internet, Intranet, local area network, etc., without participation of a live dealer. In fact, the players that are present at the same table have a feeling or participation in an actual card game since they see each other and may use such moves of a card game as bluffing, psychological interaction, or advantageous use of mistakes made by other participants. In the case of a multiple-table tournament, the servers of the individual tables can be connected with an external CPU that may use, e.g., a master-slave protocol or any other type of data exchange.

DETAILED DESCRIPTION OF THE INVENTION

Although it is known that the proposed configuration can be used for different games such as dice, dominoes and miscellaneous card games, for the preferred embodiment we will describe an electronic tournament poker table.

It will be beneficial for clarification of the scope of the embodiment if we will provide a brief overview of the rules of poker. More detailed description can be found in the vol. 18 of Encyclopaedia Britannica (p. 108 of the 1966 edition). There are forms of poker suitable to any number of players, but in most forms the ideal number is six to ten players. Poker is almost always played with the standard fifty-two-card deck with cards of each of the four suits (clubs, spades, diamonds, hearts) ranking downward from the Ace to the Two (in some combinations Ace is the low card). In addition to these cards the Wild Cards or "freaks" are introduced into the deck in some versions of the game. These terms are used to denominate an additional card, which stands for any other card its holder wishes to name (i.e. Joker). The object of the game is to win the "pot" which is the aggregate of all bets made by all players in anyone deal. The pot may be won either by having the highest-ranking hand or by making a bet no other player calls. "Hands" are the combinations generally of five cards, its value being inverse proportion to its mathematical frequency; that is the more unusual the combination of the cards, the higher the hand ranks. Further on, there is the number of varieties of the game different by the rotation, betting procedure or betting limits.

DESCRIPTION OF THE PREFERRED EMBODIMENT

Figure 1:
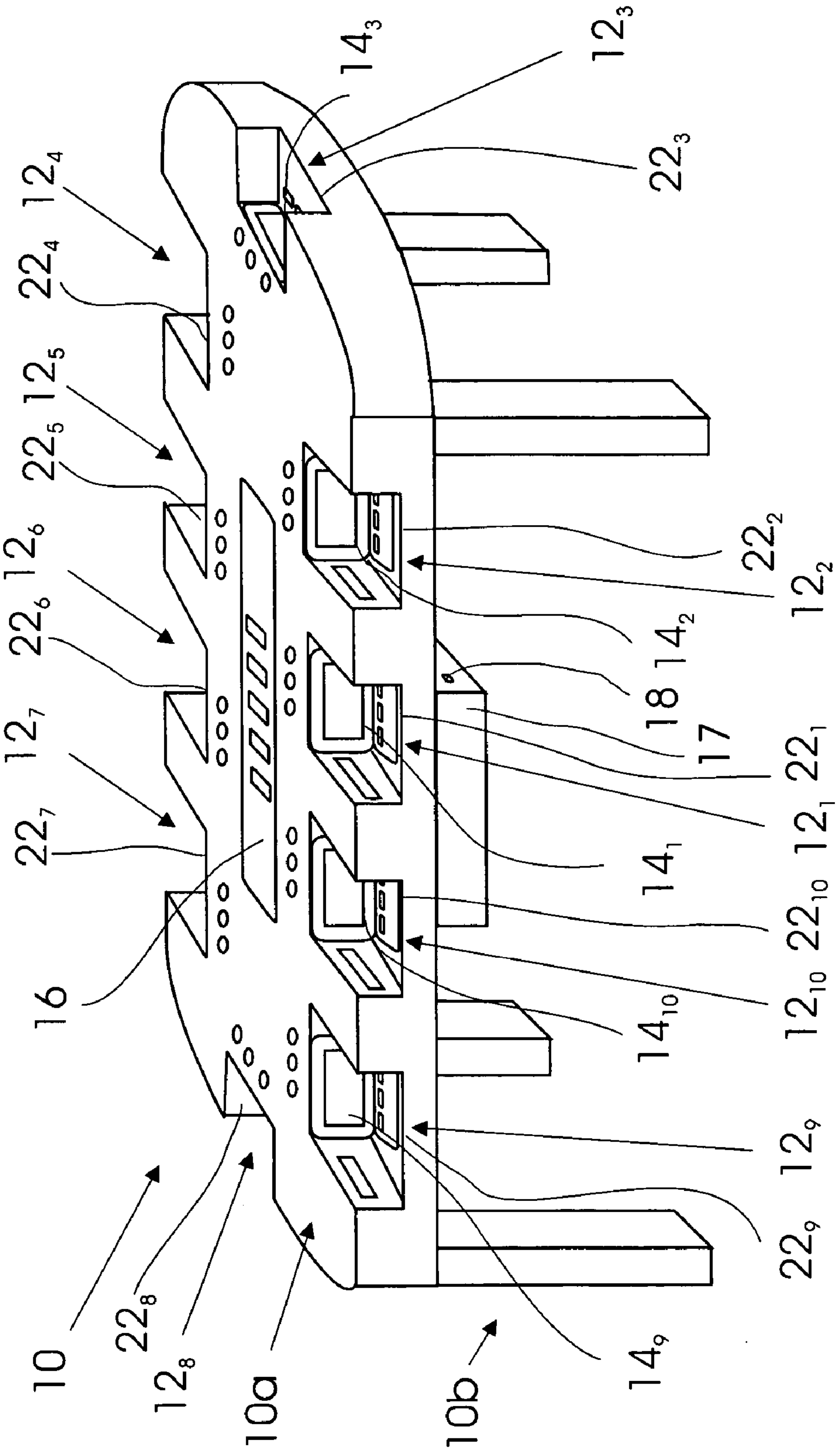
FIG. 1 shows an electronic game table according to one embodiment of the invention.

An electronic card game table of the present invention is shown in FIG. 1, which is a three-dimensional view of the table. The electronic card game table, which hereinafter will be referred to as a game table is designated as a whole by reference numeral 10. In its dimensions and shape the game table 10 corresponds to a conventional or standard card game table, e.g., the one installed in clubs or casinos for playing a poker game. In other words, the table 10 has a frame that may consist of a tabletop 10*a* and a supporting frame or base 10*b*. The table top 10*a* may have horizontal or vertical orientation. For example, the game table 10 may have a horizontal tabletop and be designated for 6 to 10 players and may have the following dimensions: 82"×42".

Although the minimum number of players may be 2 and the maximum number of players may be "n", the embodiment of the game table 10 shown in FIG. 1 is designed for 10 players. Each players sits in front of one of terminals $\mathbf{12}_1, \ldots, \mathbf{12}_{10}$ so that they can observe all other players in order to have feel of a real game where they can bluff or use other psychological moves of a real game. Each player is provided with a player interface console $\mathbf{14}_1, \ldots, \mathbf{14}_{10}$. One of possible layouts of the player interface console is considered in more detail below. The game table 10 is equipped with a common display 16 of community cards and is located in a place clearly visible for all the players. For example, a common display 16 may be located in the center of the table (as shown in FIG. 1) or on a remote hanging display panel (not shown).

The game table 10 is also provided with a table CPU 17 which is connected to all the player interface consoles $\mathbf{14}_1, \ldots, \mathbf{14}_{10}$ and has means, such as a standard or wireless port 18 for connection to other remote CPU's that may be used, e.g., for the multi-table arrangement in the case of a tournament. To assure that the cards in every pocket and financial activities of the players are kept in privacy, player interfaces can be separated by partitions or hidden in recesses $\mathbf{22}_1, \ldots, \mathbf{22}_{10}$.

Figure 2:
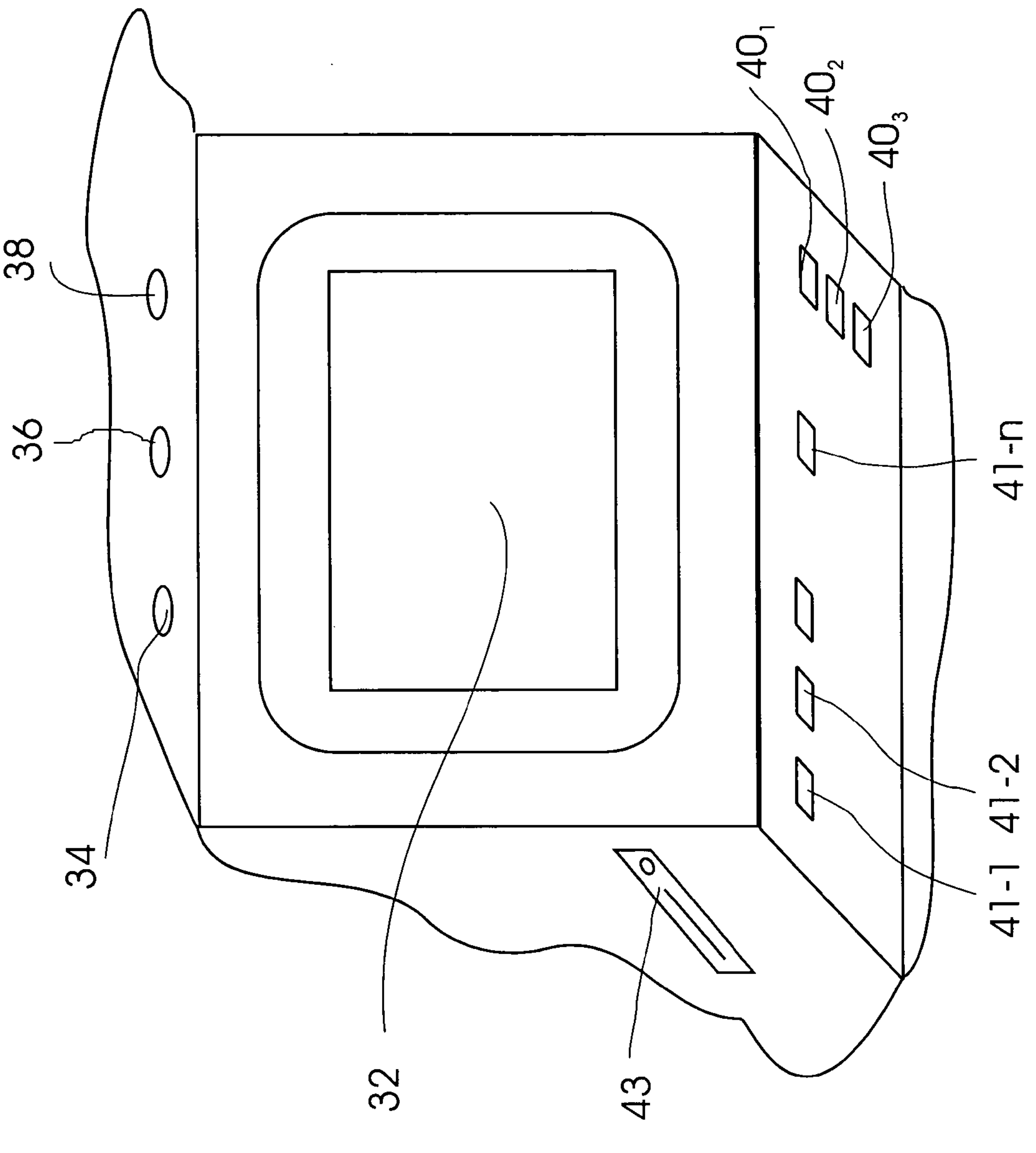
FIG. 2 shows one of the variations of the player console on the table of FIG. 1.

As shown in FIG. 2, each of the user terminals $\mathbf{12}_1, \ldots, \mathbf{12}_{10}$ consists of a display 32, a button 34 indicating a player assuming a role of a dealer in the current round (here we have to remind that the dealer role is absolutely virtual and is introduced only to assure the game flow, not to actually deal the cards), player in and out indicators 36 and 38, bet operation buttons $\mathbf{40}_1$, $\mathbf{40}_2$, and $\mathbf{40}_3$, action buttons 41-1, . . . , 41-n and means of payment (currency, credit or smart card reader) 43.

Figure 3:
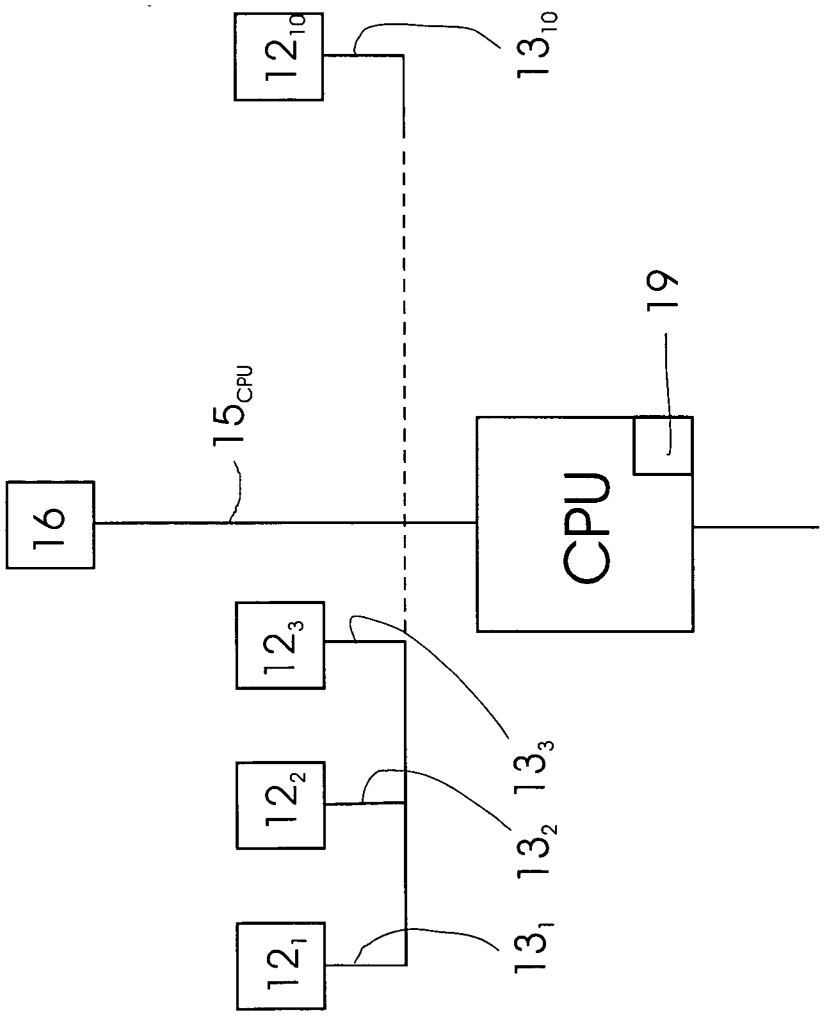
FIG. 3 is a block diagram of the electronic units of the game table of the invention.

FIG. 3 is a block diagram of the electronic units of the game table of the invention. As can be seen from this drawing, the CPU 17 contains random combination generator unit 19 which in the electronic table 10 of the invention plays a role of a principal dealer who is absent from the game as a physical person. In this connection it should be noted that not only the physical dealer but also a physical stack of card is also absent in the game. Therefore, whenever dealing the card is mentioned, it is assumed that appropriate card are seen on the screen of the appropriate displays. Each user terminal $\mathbf{12}_1, \ldots, \mathbf{12}_{10}$ is linked to the common CPU 17 via respective links $\mathbf{13}_1, \mathbf{13}_2, \ldots, \mathbf{13}_{10}$. Furthermore, the CPU 17 is linked via a link $\mathbf{15}_{cpu}$ with the common display 16.

As is known, there exists a number of varieties of the poker games different by the rotation, betting procedure or betting limits. Such varieties of the poker game are known as Seven Card Stud, Omaha Hi Lo, Texas Hold'em, etc. The rules and strategy of these games are not beyond the scope of the present invention. In order to illustrate the use of the game table 10 of the present invention, let us assume that 4 players participate in a $2/$4 Seven Card Stud game. First, all the players have occupied their positions at appropriate consoles, e.g., 121, 122, 124, 125. The tournament begins when all the seats are occupied, and funds are deposited using the credit card reader 43. According to the rule of poker, the deposits may be displayed to other players. This information can be shown either on the displays 32 or on the common display 16, After this moment, none of the players can change the seat. In order to determine who deals the first round, each player is dealt one card randomly through the action of the random combination generator unit 19. This is done by pushing on the appropriate action button, e.g., button 41-1. Let us assume that the play who gets the lowest card. This fact is indicated by this player pushing the button 34 indicating the player assuming a role of a dealer in the current round. The cards are returned to the stack by pushing an appropriate action button, e.g., button 44-2. The player who assumes a role of the dealer deals each player two cards face down and one face up, which can be done via the CPU 17 by pushing one of the action buttons.

Let us assume that all the players have anted $0.50. Betting is accomplished by pushing one of the bet operation buttons $\mathbf{40}_1$, $\mathbf{40}_2$, or $\mathbf{40}_3$. The player with the lowest up card makes a forced bet of either $1 half minimum bet or $2 full bet (player's choice) to start the game. The rest of the players, in clockwise order, either call the opening bet, raise it, using another bet operation button, or not call and "fold" their hands back to the dealer. All get a fourth card face up followed by a round of $2 betting. From this round on, the player with the highest up card(s) is always first to check or bet.

After the fifth card is dealt face up, the minimum bet goes to $4. The sixth card is dealt face up and there is another round of $4 betting. The seventh and last card is dealt face down and followed by the final round of $4 betting. All aforementioned operations, associated with pushes on any action or bet operation buttons at all the consoles are registered and stored in the CPU 17 via respective connection links $\mathbf{13}_1$, $\mathbf{13}_2$, . . . , $\mathbf{13}_{10}$. The CPU 17 analyzes the players' inputs and determines and awards the pot.

Figure 4:
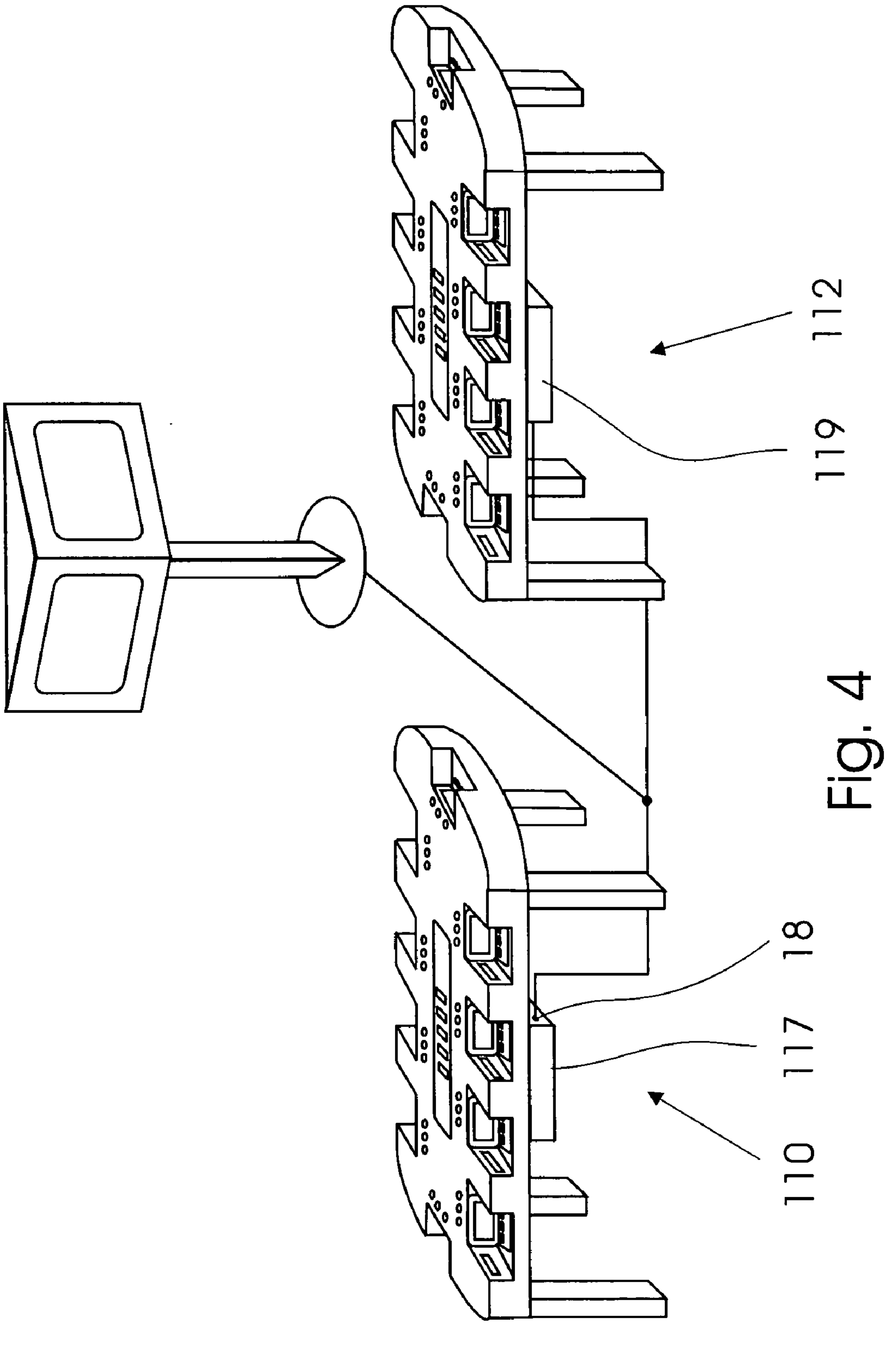
FIG. 4 shows a system for multi-table tournament on the basis of the electronic tables of the invention.

FIG. 4 illustrate an arrangement for a multi-table tournament in which several electronic game tables 110 and 112, such as the table 10 (FIG. 10) can be combined into a system in which CPU's 117 and 119 of individual tables are connected to each other and to a common multi-table display 116. This can be done via standard or wireless port 18 (FIGS. 1 and 4).

Thus, it has been shown that the present invention provides an electronic table for games with multiple participants without the presence of a common dealer, where the players may visually and psychologically interact with each other. The invention provides a table having a standard or wireless port for combining several tables into a system of a multi-table tournament.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the electronic game table of the invention may be designed for any number of participants that is equal or greater than 2. The table may have any shape, e.g., a circular or semicircular shape. The individual player terminals can be located on the bottoms of the hidden recesses made in the surface of the table top. The table is intended for a great variety of tournament games without limitation to the card games or to specific card games. For example the table can be used for playing dominoes, dice, etc. The outlet port of the table's CPU can be used for connection to a local area network or to Internet, Intranet, etc.

The invention claimed is:

1. An electronic game table for at least two players engaging in a completely electronic competitive game that uses both confidential cards and community cards comprising:

a table having a surface;

a plurality of individual player terminals arranged at or beneath the surface of said table, each of said individual player terminals comprising a terminal display and a data input device comprising a plurality of player activated electronic game function buttons including an action button and a betting button;

a central processing unit connected to the game function buttons of each of said individual player terminals for bi-directional data exchange with each of said individual player terminals, said central processing unit configured to cause the display of at least an electronic representation of confidential cards and a representation of game status on each of said terminal displays; and a single common display showing multiple community cards and betting information for each player, the common display located at the center of the table and horizontally mounted in the tabletop surface continuously displaying said community cards and betting information to all the players.

2. The electronic game table of claim 1, wherein said central processing unit is provided with an outlet port for connection to external electronic means.

3. The electronic game table of claim 2, wherein said external electronic means are selected from the group consisting of a local area network, the Internet, and an Intranet.

4. The electronic game table of claim 1, wherein said plurality of player activated electronic game function buttons comprises at least control means for anteing the bets, control means for betting, control means for indicating a role of a player acting in the capacity of a dealer in a current round.

5. The electronic game table of claim 4, wherein said position of the single common display is a position selected from the group consisting from of; a horizontal position on and flush with said table top, and a vertical position outside said table top.

6. The electronic game table of claim 5, wherein said central processing unit is provided with an outlet port for connection to external electronic means.

7. The electronic game table of claim 6, wherein said external electronic means are selected from the group consisting of a local area network, the Internet, and an Intranet.

8. The electronic game table of claim 1, wherein the electronic competitive game is a poker game, and wherein the individual terminals are spaced around the table for a number of players from two to ten.

9. The electronic game table of claim 8, wherein said central processing unit is provided with an outlet port for connection to external electronic means.

10. The electronic game table of claim 8, wherein said external electronic means are selected from the group consisting of a local area network, the Internet, and an Intranet.

11. The electronic game table of claim 8, wherein said data input device comprises at least control means for anteing the bets, control means for betting, control means for indicating a role of a dealer in a current round.

12. The electronic game table of claim 11, wherein said position visible to said at least two players is a position selected from the group consisting of: a position on said table top, and a position outside said table top.

13. The electronic game table of claim 12, wherein said central processing unit is provided with an outlet port for connection to external electronic means.

14. The electronic game table of claim 13, wherein said external electronic means are selected from the group consisting of a local area network, the Internet, and Intranet.

15. The system of claim 1, wherein said central processing unit deals said confidential cards to each individual player terminal.

16. The system of claim 1, wherein the display of said confidential cards is obscured from players associated with other individual player terminals.

17. The system of claim 1, wherein said confidential cards are only visible from the individual player terminal on which they were caused to be displayed.

18. The system of claim 1, wherein each individual player terminal is configured to obscure the display of said confidential cards from other individual player terminals.

19. A system for playing an electronic card game, comprising:

(a) a table having surface and a plurality of player positions;

(b) a player display at or beneath the surface of the table corresponding to each player position, the player display configured to present virtual pocket cards to a player such that the display of the virtual pocket cards is obscured from other player positions;

(c) a central processing unit configured to deal virtual pocket cards to the player displays and at least two different community cards to the community display and cause the respective player displays to present the virtual pocket cards to a corresponding player, the central processing unit configured to receive input from the input mechanism related to the virtual pocket cards that are presented;

(d) an input mechanism accessible from and associated with each of the player positions comprising a plurality of player activated electronic game function buttons connected to the central processing unit; and (e) a single common display showing multiple community cards and betting information for each player, the common display located at the center of the table and horizontally mounted in the surface continuously displaying said community cards and betting information to all the players.

20. The system of claim 19, wherein said virtual pocket cards displayed on the player display are confidential.

21. A dealerless game table for playing an automated card game exclusively using images of cards and automated betting without chips, the game table comprising:

a horizontal tabletop having two or more player positions;

a supporting base;

player interface console terminals positioned within the tabletop at each of the player positions so that each player can observe all other players, the terminals each comprising:

(a) a private screen to display pocket cards and betting information relevant only to one particular player;

(b) a player in/out indicator;

(c) several bet operation buttons on or adjacent the screen;

(d) several action buttons on or adjacent the screen; and (e) a player operated automated payment device;

a single common display showing multiple community cards and betting information for each player, the common display located at the center of the table and horizontally mounted in the tabletop surface continuously displaying said community cards and betting information of all the players is visible to all the players; and a table central processing unit connected to all the console terminals and to the single common display, wherein the table central processing unit performs one or more functions of a dealer and automatically conducts the play of the game based upon inputs from the player interface console terminals.

22. The dealerless game table of claim 21 wherein the payment device is a bill acceptor for accepting paper currency.

23. The dealerless game table of claim 21 wherein the payment device is a card reader for reading information from a card.

24. The dealerless game table of claim 23 wherein the card reader reads a magnetic strip.

* * * * *